March 29, 1949. R. F. SHARROW ET AL 2,465,820

DYNAMOELECTRIC MACHINE MEMBER

Filed Dec. 17, 1947

Inventors:
Robert F. Sharrow,
Clairmont J. Herman,
by
Their Attorney.

Patented Mar. 29, 1949

2,465,820

UNITED STATES PATENT OFFICE 2,465,820

DYNAMOELECTRIC MACHINE MEMBER

Robert F. Sharrow and Clairmont J. Herman, Fort Wayne, Ind., assignors to General Electric Company, a corporation of New York Application December 17, 1947, Serial No. 792,178

8 Claims. (Cl. 171—206)

This invention relates to members for dynamoelectric machines and more particularly to improved means for holding the windings in the winding slots and for securing the end turns of the windings outside the slots.

In the conventional construction of dynamoelectric machines, particularly in fractional horsepower frame sizes, it is customary to lace or tie the end turns of the windings which are outside the winding slots in order to provide sufficient support to prevent damage to the windings from vibration and to hold the end turns securely in place.

It is an object of this invention to provide an improved member for a dynamoelectric machine.

Another object of this invention is to provide an improved member for a dynamoelectric machine in which the slot wedges are also adapted to hold the end turns of the windings outside the slots securely in place.

A further object of this invention is to provide an improved slot wedge member for a dynamoelectric machine.

Further objects and advantages of this invention will become apparent and the invention will be better understood from the following description referring to the accompanying drawing, and the features of novelty which characterize this invention will be pointed out with particularity in the claims annexed to and forming a part of this specification.

A feature of this invention is the provision of slot wedge members adapted to hold the windings securely in place in the winding slots and having portions extending beyond the slots adapted to hold the end turns of the windings outside the slots securely in place.

Figure 1:
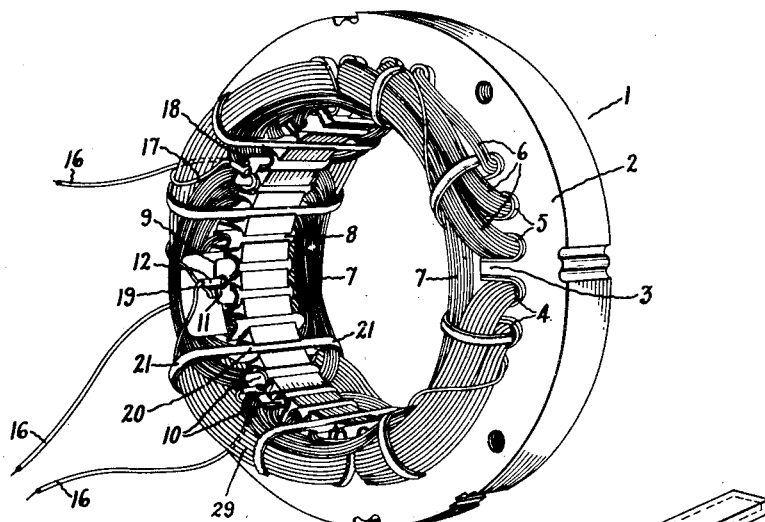
Figure 2:
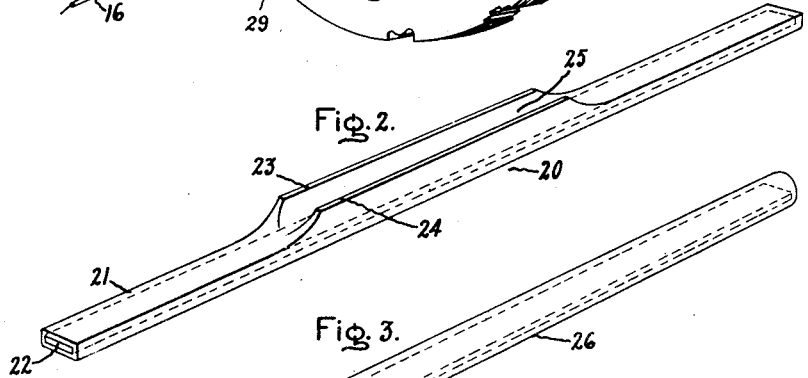
Figure 3:
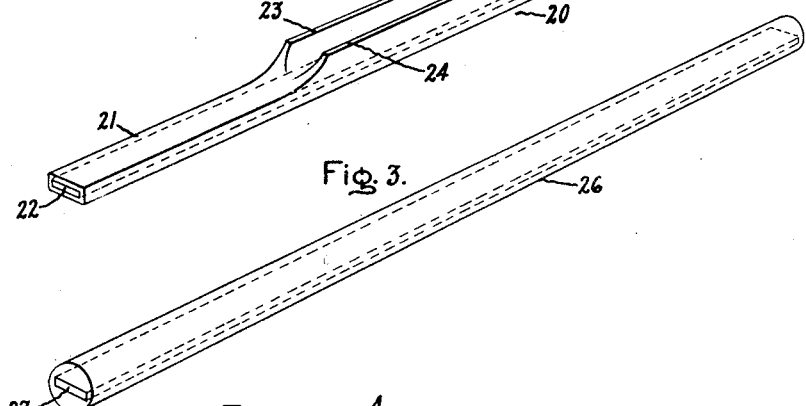
Figure 4:
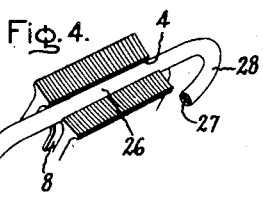

In the drawing, Fig. 1 illustrates a stationary member or stator for a dynamoelectric machine of fractional horsepower frame size incorporating the improved slot wedge members of this invention; Fig. 2 is a detailed view of the improved slot wedge member of Fig. 1; Fig. 3 illustrates an alternative form of this invention, and Fig. 4 shows a fragmentary portion of a dynamoelectric machine member illustrating the use of the wedge of Fig. 3.

Referring now to Fig. 1, there is shown a stationary member for a dynamoelectric machine having a magnetizable core 1 which may be conveniently formed of a plurality of relatively thin laminations. The core consists of a main or yoke portion 2 having teeth 3 extending radially inward therefrom to form a plurality of coil-winding slots 4. These slots are provided with slot liners 5 formed of insulating material such as is described in Patents 2,169,097 and 2,180,983 to Hall. These slot liners may be formed from an extruded strip of material having cuffed or beaded edges which abut the sides of the slots 4. In the embodiment of this invention shown in Fig. 1, the slots are shown as containing superimposed layers of turns or sides of different coils and, specifically, the layers of coil sides of insulated motor running windings 6 and over that a layer of coil sides of insulated starting windings 7.

In order to provide for holding the windings in place and for closing the slots 4, single slot wedge members 8 are positioned in the slots 4 over the windings, and multiple slot wedge members 9 positioned in some of the slots over the windings and under the single slot wedge members 8. These slot wedge members may be molded of flexible insulating material, preferably of a plastic of the type including superpolyamide resins, such as the reaction product of hexamethylene diamine and adipic acid, the reaction product of hexamethylene diamine, and sebacic acid, or alternatively the polyvinyl acetals such as the reaction product of a partially hydrolyzed polyvinyl acetate and aldehyde, such as formaldehyde or butyraldehyde.

The multiple slot wedge members 9 are more fully described in the Patent No. 2,443,455, July 26, 1948, to Clairmont J. Herman and assigned to the assignee of the present application. These members are formed of a single unitary structure having a plurality of slot wedge fingers 10 and a transverse portion 11 joining the wedges at one end. These multiple slot wedges are utilized to provide a secure location for affixing the connections between the various wires of the machine. This feature is more adequately described and illustrated in Patent No. 2,443,456, July 26, 1948, to Clairmont J. Herman and assigned to the assignee of the present application. As described in the aforesaid application, spade type connectors 12 are secured to the transverse portions 11 of the multiple slot wedges 9. The ends of the various windings are connected together in the appropriate relationship by these connectors by conventional means such as soldering. As shown in Fig. 1, the external leads 16 of the machine are connected to the winding ends 17, as at 18 and the winding ends are interconnected, as at 19 by means of the connectors.

The portions of the various windings which are located outside of the winding slots 4 form end turns 29. These end turns must be secured to prevent damage from vibration and short circuits caused by the wires rubbing against each other. The conventional lacing or tying method of securing these end turns is costly due to the hand labor involved. In order to provide an improved means for securing these end turns, the construction now to be described is provided.

A plurality of slot wedge members 20 are provided positioned in the slots 4 of the windings and spaced at intervals around the internal periphery of the member. These slot wedge members may be similar in cross-section to slot wedge members 8, however, they are provided with portions 21 extending beyond the slots. These extensions are bent or formed, after the wedge is inserted in the slot, around the end turns of the windings outside the winding slots in order to secure the end turns in place. These slot wedge members are preferably formed of insulating material, such as the materials described above.

It was found difficult to obtain sufficient rigidity with a wedge and end turn holding member formed of insulating material alone, and therefore it was found desirable to mold or otherwise affix a thin strip of mild steel or other suitable metal to the wedge in order to provide the necessary additional rigidity.

Referring now to Fig. 2, there is shown one embodiment of the wedge member 20 of Fig. 1, this wedge member being formed of extruded material having a metal strip 22 molded into the base of the wedge during the extruding process. The wedge is initially extruded with lip portions 23 and 24 defining a recess 25 therebetween. The extensions 21 are then formed by cutting off the lip portions at either end of the wedge, however, leaving the lip portions 23 and 24 at the central part of the wedge to form the slot closing and winding holding part of the member. A wedge member of the form shown in Fig. 2 incorporates both the features of a slot wedge and an end turn holding device, and therefore is not utilized with a separate single slot wedge, as shown in Fig. 1. While the metal strip 22 is shown molded into the base portion of the wedge member, it is to be understood that this strip could be suitably affixed to the surface of the wedge after the extruding operation.

Referring now to Fig. 3, there is shown an alternative embodiment of this invention in which a metal strip is inserted in a hollow strip 26 formed of insulating material, shown here as being of tubular cross section. As shown in Fig. 4, this wedge member including the hollow strip 26 and metal strip 27, is inserted in the winding slot 4 over or under a single slot wedge member 8, the extension portions 28 being then bent or formed to hold the end turns 29 securely in place.

It will now be apparent that this improved construction eliminates the necessity for lacing or tying the end turns of the windings outside the winding slots thereby greatly reducing the cost of construction.

While we have illustrated and described particular embodiments of our invention, modifications thereof will occur to those skilled in the art. We desire it to be understood, therefore, that our invention is not to be limited to the particular arrangements disclosed and we intend in the appended claims to cover all modifications which do not depart from the spirit and scope of our invention.

What we claim as new and desire to secure by Letters Patent of the United States is:

1. A member for a dynamoelectric machine having a plurality of winding slots formed therein, a plurality of windings positioned in said slots, and a plurality of slot wedge means for closing said slots and for holding said windings tightly therein, said means having portions extending beyond said slots adapted to be formed around the end turns of said windings outside said slots for securely holding said end turns in place.

2. A member for a dynamoelectric machine having a plurality of winding slots formed therein, a plurality of windings positioned in said slots, and a plurality of slot wedge means for closing said slots and for holding said windings tightly therein, said means including a hollow strip formed of insulating material and a metal strip inserted in said hollow strip, said means having portions extending beyond said slots adapted to hold the end turns of said windings outside said slots securely in place.

3. A member for a dynamoelectric machine having a plurality of winding slots formed therein, a plurality of windings positioned in said slots, and a plurality of slot wedge means for closing said slots and for holding said windings tightly therein, said means being formed of insulating material with a metal strip affixed thereto, said means having portions extending beyond said slots adapted to hold the end turns of said windings outside said slots securely in place.

4. A member for a dynamoelectric machine having a plurality of winding slots formed therein, a plurality of windings positioned in said slots, and a plurality of slot wedge means for closing said slots and for holding said windings tightly therein, said means being formed of extruded insulating material with a metal strip therein, said means having portions extending beyond said slots adapted to hold the end turns of said windings outside said slots securely in place.

5. A slot wedge member adapted to be positioned in the winding slots of a dynamoelectric machine member and to hold the windings tightly therein, said slot wedge having portions extending beyond said slots adapted to hold the end turns of said windings outside said slots securely in place.

6. A slot wedge member adapted to be positioned in the winding slots of a dynamoelectric machine member and to hold the windings tightly therein, said wedge including a hollow strip formed of insulating material and a metal strip inserted in said hollow strip, said wedge having portions extending beyond said slots adapted to hold the end turns of said windings outside said slots securely in place.

7. A slot wedge member adapted to be positioned in the winding slots of a dynamoelectric machine member and to hold the windings tightly therein, said wedge being formed of insulating material with a metal strip affixed thereto, said wedge having portions extending beyond said slots adapted to hold the end turns of said windings outside said slots securely in place.

8. A slot wedge member adapted to be positioned in the winding slots of a dynamoelectric machine member and to hold the windings tightly therein, said wedge being formed of extruded insulating material with a metal strip therein, said wedge having portions extending beyond said slots adapted to hold the end turns of said windings outside said slots securely in place.

ROBERT F. SHARROW.
CLAIRMONT J. HERMAN.

REFERENCES CITED

The following references are of record in the file of this patent:

UNITED STATES PATENTS

| Number | Name | Date |
|---|---|---|
| 1,311,466 | Sandfield | July 29, 1919 |
| 1,512,693 | Julleard | Oct. 21, 1924 |
| 2,386,673 | Fisher | Oct. 9, 1945 |